United States Patent Office 3,819,751
Patented June 25, 1974

3,819,751
DIALKYL ACYL PHOSPHONATE,
O-(ALKYLCARBAMOYL) OXIMES
William D. Dixon, Kirkwood, Mo., assignor to Monsanto Company, St. Louis, Mo.
No Drawing. Filed Dec. 6, 1971, Ser. No. 210,225
Int. Cl. A01n 9/36; C07f 9/40
U.S. Cl. 260—938        2 Claims

ABSTRACT OF THE DISCLOSURE

Dialkyl acyl phosphonate, O-(alkylcarbamoyl)oximes are prepared by reacting an oxime of a dialkyl acyl phosphonate with an isocyanate in the presence of a catalytic amount of a trialkyl amine. These compounds are pesticidally active and particularly useful as pre-emergent herbicides and insecticides.

---

Dialkyl acyl phosphonate, O-(alkylcarbamoyl)oximes

This invention relates to dialyl acyl phosphonate, O-(alkylcarbamoyl)oximes of the formula

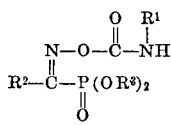

wherein $R^1$ is lower alkyl, $R^2$ is selected from the group which consists of lower alkyl and

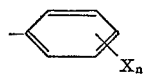

wherein X is selected from halo, trifluoromethyl, lower alkyl or lower alkoxy and $n$ is an integer from 0 through 2, inclusive, and $R^3$ is lower alkyl.

As employed herein, the terms "lower alkyl" and "lower alkoxy" designate those groups wherein the aliphatic chain is straight or branched and has from 1 through 4 carbons inclusive. The term "halo" designates a halogen atom selected from fluorine, chlorine, bromine and iodine. Preferred halo are chloro and bromo.

The compounds of this invention are conveniently and efficiently prepared by the reaction, in the presence of a catalytic amount of a trialkyl amine, of about equimolecular proportions of an oxime of a dialkyl acyl phosphonate of the formula

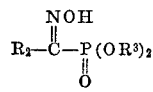

and an isocyanate of the formula $$R^1NCO$$

wherein $R^1$, $R^2$ and $R^3$ have the aforementioned significance. The reaction is postulated to proceed as follows:

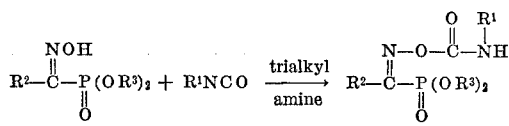

The reaction is conducted in the contacting presence of a trialkyl amine. Preferred trialkyl amines have from 2 through 5 carbons in the alkyl group. The amount of trialkyl amine is preferably from about 0.003 to about 2 percent by weight, based on the isocyanate, more preferably from about 0.01 to about 1 percent by weight, based on the isocyanate.

The reaction mass may consist only of the afore-described compounds and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to chlorinated hydrocarbons, such as chloroform, methylene chloride, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc.

The reaction is normally carried out at a temperature above the freezing point of the system but preferably not above its boiling point. Still more preferably, the reaction is carried out at temperatures of from about 0 degrees Centigrade (° C.) to about 60° C. The reaction is most conveniently carried out in a solvent media at room temperature, about 23° C., in the presence of a catalytic amount of triethyl amine. The reaction is usually carried out at atmospheric pressure, but higher or lower pressures may be utilized if equipment and other factors favor such higher or lower pressures. The reaction may be carried out in an open vessel or under reflux.

Dialkyl acyl phosphonate, O-(alkylcarbamoyl)oximes of this invention are useful as biocides. Exemplary of such biocidal uses for these products is the control of nematodes, arachnids, arthropods and insects as well as eradication of noxious weeds. These compounds are particularly useful as selective herbicides and as inhibitors of enzymatic activity in certain insect pests.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compounds which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of oximes of dialkyl acyl phosphonates, used as starting materials in the preparation of the compounds of the present invention, is taught by K. Darrell Berlin, Robert T. Claunch, and E. T. Gaudy in their article entitled "Alpha-Aminoarylmethylphosphonic Acids and Diethyl Alpha-Aminoarylmethylphosphonate Hydrochlorides. Aluminum-Amalgam Reduction of Oximes of Diethyl Aroylphosphonates" appearing in Volume 33, No. 8, pages 3090–3095 of *The Journal of Organic Chemistry*, August 1968.

Isocyanates used in the preparation of the compounds of the present invention are either known compounds or may be prepared by prior art methods from known compounds.

As illustrative of this invention, but not limitative thereof, is the following:

EXAMPLE 1

To a suitable reaction vessel equipped with an agitator is charged approximately 50 milliliters (ml.) of chloroform. Approximately 5.2 grams (g.), about 0.02 moles, of diethyl orthochlorobenzoylphosphonate oxime is then added. With stirring approximately 1.14 g., about 0.02 moles, of methyl isocyanate are added followed by approximately one drop of triethyl amine. The mass is stirred for about 4 hours. Thereafter the chloroform is removed under vacuum leaving an oily residue. The oil is cooled in an ice bath, and, upon scratching the side of the vessel, a white solid crystallizes out of the oil. The white solid is separated from the liquid by filtration, is recrystallized from a mixture of about equal parts by volume of chloroform and pentane, is found to be soluble in acetone, chloroform, ethanol and benzene and to have a melting point of about 67 to 72° C. and is identified by nuclear magnetic resonance as diethyl ortho-chlorobenzoylphosphonate, O-(methylcarbamoyl)-oxime.

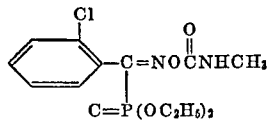

Calculated for $C_{13}H_{18}ClN_2O_5P$: C, 44.79; H, 5.20. Found: C, 44.91; H, 5.31.

EXAMPLE 2

To a suitable reaction vessel equipped with an agitator is charged about 100 ml. of diethyl ether. Approximately 16.4 g., about 0.1 moles, of diethyl acetylphosphonate oxime is added to the diethyl ether. Approximately 5.7 g., about 0.1 mole, of methyl isocyanate is then added. Thereafter approximately one drop of triethyl amine is added and the mass is stirred over the weekend. The diethyl ether is then removed under vacuum. The residue is subjected to chromotography on neutral alumina by eluting with carbon tetrachloride. The colorless liquid is found to be soluble in acetone and chloroform and is identified by nuclear magnetic resonance as diethyl acetylphosphonate, O-(methylcarbamoyl)oxime

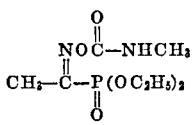

Calculated for $C_8H_{17}N_2O_5P$: C, 38.01; H. 6.75. Found: C, 38.18; H, 7.01.

EXAMPLE 3

To a suitable reaction vessel equipped with an agitator is charged about 100 ml. of chloroform. Approximately 11.5 g., about 0.04 moles, of diethyl para-anisoylphosphonate oxime is added to the chloroform. Approximately 2.3 g., about 0.04 moles of methyl isocyanate is then added. Thereafter approximately one drop of triethyl amine is added and the mass is stirred overnight. The chloroform is then removed under vacuum. The remainder is subjected to chromatography on neutral alumina by eluting with chloroform. The vicous liquid is found to be soluble in acetone, ethanol and chloroform and is identified by infra-red analysis and nuclear magnetic resonance as diethyl para-anisoylphosphonate, O-(methylcarbamoyl) oxime

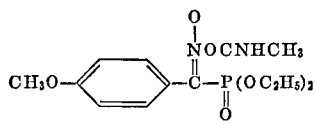

Calculated for $C_{14}H_{21}N_2O_6P$: C, 48.84; H, 6.15. Found: C, 48.65; H, 6.29.

EXAMPLE 4

To a suitable reaction vessel equipped with an agitator is charged about 150 ml. of chloroform. Approximately 26.0 g., about 0.1 mole, of diethyl para-chlorobenzoylphosphonate oxime is added to the chloroform. Approximately 5.7 g., about 0.1 mole, of methyl isocyanate is then added. Thereafter approximately one drop of triethyl amine is added and the mass is stirred overnight. The chloroform is then removed under vacuum and the residue is subjected to chromatography on neutral alumina eluting with chloroform. The viscous liquid is found to be soluble in acetone, ethanol and acetone and is identified by nuclear magnetic resonance as diethyl para-chlorobenzoylphosphonate, O-(methylcarbamoyl)oxime

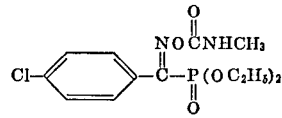

Calculated for $C_{13}H_{18}ClN_2O_5P$: C, 44.79; H, 5.20. Found: C, 44.98; H, 4.81.

EXAMPLES 5 AND 6

The procedure of Example 1 is followed except that in place of triethyl amine about one drop of the specified trialkyl amine is added. The product of Example 1 is obtained.

Example 5—Tripropyl amine.
Example 6—Tributyl amine.

EXAMPLES 7 THROUGH 17

The procedure of Example 4 is followed except that, in place of about 26.0 g. of diethyl para-chlorobenzoylphosphonate oxime, an approximately equimolecular amount of the compound of Column A is charged and the product of Column B is obtained:

| Ex. | A | B |
| --- | --- | --- |
| 7 | Dimethyl meta-bromobenzoyl-phosphonate oxime. | Dimethyl metabromobenzoylphosphonate, O-(methylcarbamoyl)oxime. |
| 8 | Dibutyl propionylphosphonate oxime. | Dibutyl propionylphosphonate, O-(methylcarbamoyl)oxime. |
| 9 | Diisopropyl metatrifluoromethylbenzoylphosphonate oxime. | Diisopropyl metatrifluoromethylbenzoyl phosphonate, O-(methylcarbamoyl)oxime. |
| 10 | Diethyl 3,4-xyloylphosphonate oxime. | Diethyl 3,4-xyloylphosphonate, O-(methylcarbamoyl)oxime. |
| 11 | Diethyl (4-chloro-orthoanisoyl)-phosphonate oxime. | Diethyl (4-chloro-orthoanisoyl)-phosphonate, O-(methylcarbamoyl)oxime. |
| 12 | Diisobutyl benzoylphosphonate oxime. | Diisobutyl benzoylphosphonate, O-(methylcarbamoyl)oxime. |
| 13 | Dipropyl butyrylphosphonate oxime. | Dipropyl butyrylphosphonate, O-(methylcarbamoyl)oxime. |

TABLE—Continued

| Ex. | A | B |
|---|---|---|
| 14 | Dimethyl isobutyrylphosphonate oxime. | Dimethyl isobutyrylphosphonate O-(methylcarbamoyl)oxime. |
| 15 | Diisopropyl 2,6 difluorobenzoylphosphonate oxime. | Diisopropyl 2,6 difluorobenzoylphosphonate, O-(methylcarbamoyl)oxime. |
| 16 | Dimethyl para-isopropylbenzoylphosphonate oxime. | Dimethyl para-isopropylbenzoyl phosphonate, O-(methylcarbamoyl)oxime. |
| 17 | Dimethyl meta-butylbenzoylphosphonate oxime. | Dimethyl meta-butylbenzoylphosphonate, O-(methylcarbamoyl)oxime. |

EXAMPLES 18 THROUGH 20

The procedure of Example 4 is followed except that, in place of about 5.7 g. of methyl isocyanate, an approximately equimolecular amount of the compound of Column A is charged and the product of Column B is obtained:

| Ex. | A | B |
|---|---|---|
| 18 | Isopropyl isocyanate | Diethyl para-chlorobenzoylphosphonate, O-(isopropylcarbamoyl)oxime. |
| 19 | Ethyl isocyanate | Diethyl para-chlorobenzoylphosphonate, O-(ethylcarbamoyl)oxime. |
| 20 | Butyl isocyanate | Diethyl para-chlorobenzoylphosphonate, O-(butylcarbamoyl)oxime. |

EXAMPLE 21

Contact herbicidal activity of representative dialkyl acyl phosphonate, O-(alkylcarbamoyl)oximes of this invention is determined by the following procedure:

The compound to be tested is applied in spray form to plants of a given age of several grasses and broadleaf species planted in aluminum pans. After the plants are the desired age, each aluminum pan of plants is sprayed with a given volume of a 0.2 concentration solution of the candidate chemical, corresponding to a rate of approximately 3.6 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compounds prepared in Examples 2 and 4 is observed against lambsquarter.

EXAMPLE 22

Pre-emergent herbicidal activity of representative dialkyl acyl phosphonate, O-(alkylcarbamoyl)oximes of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain the specified rate of application calculated in units as lbs. per acre. The pans are then placed on a sand bench in the greenhouse and watered from below as needed. The plants are observed at the end of approximately 14 days and the results recorded.

Pre-emergent activity of the compound prepared in Example 1 applied at a rate of 1 lb. per acre is observed against morning glory, velvetleaf, cocklebur, Johnson grass and crabgrass. Pre-emergent activity of the compound prepared in Example 3 applied at a rate of 10 lbs. per acre is observed against lambsquarter. Pre-emergent activity of the compound prepared in Example 4 applied at a rate of 5 lbs. per acre is observed against velvetleaf, morning glory, lambsquarter and Johnson grass.

In terms of enzymatic inhibition, it is known that the commercial carbamate and organophosphate insecticides serve to inhibit cholinesterase activity. Compounds of this invention are tested for this purpose in the following manner.

EXAMPLE 23

Approximately 2000 houseflies are homogenized in 300 mls of cold distilled water. The homogenate is filtered through two layers of cheesecloth to remove large debris. The filtered homogenate is next centrifuged for 10 minutes at 12,000 $\times g$. The pellet is discarded and the supernatant is again filtered through two layers of cheesecloth and centrifuged for 60 minutes at 105,000 $\times g$. Following centrifuging the supernatant is poured off and discarded. The resultant pellet (microsomal fraction) is resuspended in a minimum volume of cold distilled water and frozen at $-10°$ C. for no longer than six weeks. Prior to use the frozen microsomal fraction is thawed and made up to 150 mls. with cold distilled water. The microsomes are then sonicated with a Bronson sonicator for 30 seconds to disperse the microsomes. Approximately 75% of the original cholinesterase actively present in the whole homogenate is recorded in the microsomal fraction.

Measurements of the inhibition of housefly cholinesterase are made on a Technicon Auto Analyser essentially as described by G. D. Winter, *Ann, N.Y. Acad. Sci.*, Vol. 87, pp. 875–882 (1960). Inhibition of housefly cholinesterase to the extent shown in the table below is found using each of the compounds of Examples 1 through 4 at the concentrations specified. — denotes no test at the specified concentration. Figures opposite the example number denote percent inhibition.

| Compound of Example No. | Concentration (p.p.m.) | | | | | | |
|---|---|---|---|---|---|---|---|
| | 10 | 1 | 0.2 | 0.1 | 0.02 | 0.01 | 0.001 |
| 1 | — | 90 | 90 | 90 | 70 | 60 | 10 |
| 2 | 90 | 30 | — | 0 | — | — | — |
| 3 | — | 90 | 50 | 20 | — | — | — |
| 4 | — | 80 | 50 | 20 | — | — | — |

EXAMPLE 24

The procedure for testing insecticidal activity of a representative dialkyl acyl phosphonate O-(alkylcarbamoyl)oxime of this invention against the southern corn rootworm is as follows:

To a growth pouch (diSPo Seed-Pak growth pouch, catalog No. B1220, of Scientific Products Division of American Hospital Supply Corporation, Evanston, Ill.) in an upright position is added 20 ml. of distilled water. Thereafter is added 0.1 ml. of an acetone solution of known concentration in percent by weight of a compound of this invention (for example a 0.1 ml. of a 0.2% by weight acetone solution of the compound provides a concentration of 10.0 p.p.m. thereof). In the trough of the pouch formed by the paper wick thereof are placed two corn seeds (*Zea mays*, Hybrid U.S. 13) about one inch apart. Thereupon to the trough and between the seeds is added 8 to 12 ready-to-hatch eggs of the southern corn rootworm (*Diabrotica undecimpuctata howardi*) which eggs are washed (with distilled water) free of the soil in which they are incubated at room temperature for 21 days immediately prior to their placement in the trough. The so-charged growth pouch is then placed in an upright position in an incubator maintained at 80° F. and 70% relative humidity for 14 days. Immediately thereafter the growth pouches are removed and the extent of kill of the corn rootworm larvae is observed.

A 100% rate of kill is observed with the compound of Example 4 applied at a rate of 5 p.p.m. Insecticidal activity of the compound of Example 4 against the western corn rootworm (*Diabrotica virgifera*) is also indicated.

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A dialkyl acyl phosphonate, O-(alkyl-carbamoyl) oxime of the formula

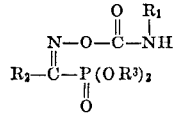

wherein $R^1$, $R^2$ and $R^3$ are each lower alkyl.

2. The compound of claim 1 wherein $R^1$ and $R^2$ are each methyl and $R^3$ is ethyl.

References Cited

UNITED STATES PATENTS

| | | | |
|---|---|---|---|
| 3,462,490 | 8/1969 | Payne et al. | 260—566 AC |
| 3,299,137 | 1/1967 | Payne et al. | 260—566 AC |

FOREIGN PATENTS

| | | | |
|---|---|---|---|
| 1,207,788 | 10/1970 | Great Britain | 260—938 |

ANTON H. SUTTO, Primary Examiner

U.S. Cl. X.R.

260—944, 968; 71—86; 424—211